Dec. 12, 1961    H. H. PANCHO, SR., ET AL    3,012,450
SAW FILING IMPLEMENT
Filed Dec. 24, 1958
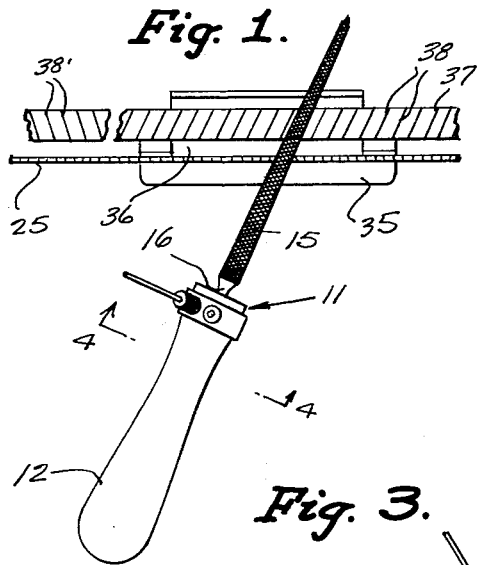
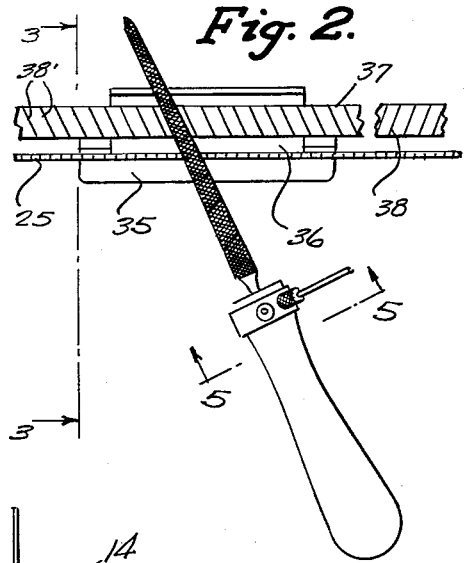
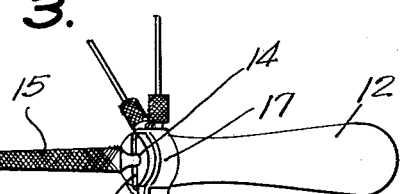
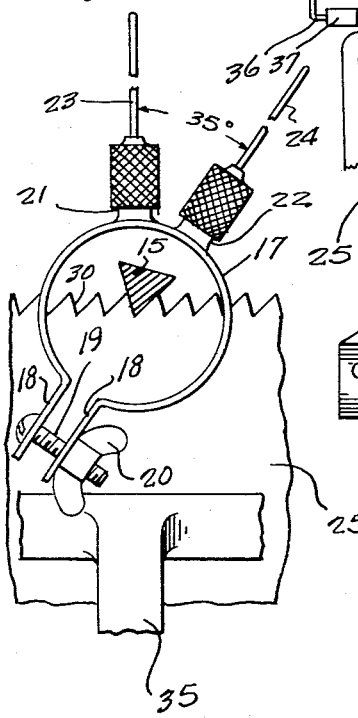
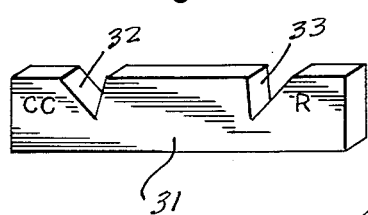
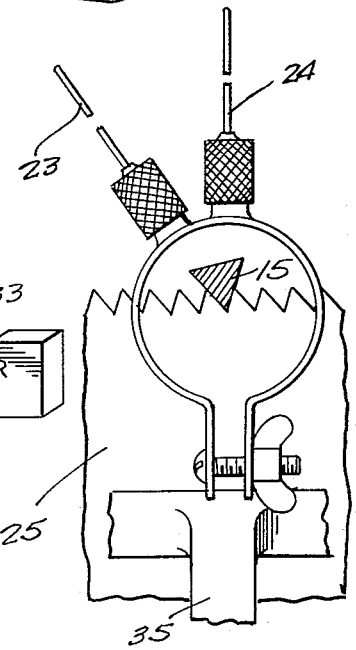
INVENTOR.
HASTINGS H. PANCHO, SR.
BY HASTINGS H. PANCHO, JR.
McMorrow, Berman & Davidson
ATTORNEYS 3,012,450
SAW FILING IMPLEMENT
Hastings H. Pancho, Sr., and Hastings H. Pancho, Jr., both of P.O. Box 834, Reno, Nev.
Filed Dec. 24, 1958, Ser. No. 782,804
2 Claims. (Cl. 76—36)

This invention relates to devices for sharpening saws, and more particularly to guide means for insuring proper orientation of a triangular file employed to sharpen the tooth surfaces of a hand saw.

A main object of the invention is to provide a novel and improved saw filing implement for use in sharpening the cutting faces of a hand saw, the implement being simple in construction, being easy to use, and providing a means for accurately guiding a triangular file during the process of sharpening the saw teeth.

A further object of the invention is to provide an improved saw filing tool which is inexpensive to manufacture, which is easy to adjust to provide the proper angle to be maintained for the saw being sharpened, being compact in size and being durable in construction.

Further objects and advantages of the invention will become apparent from the following description and claims, and from the accompanying drawings, wherein:

FIGURE 1 is a fragmentary top plan view of a saw filing implement according to the present invention, shown in working position over the serrated edge of a hand saw to be sharpened.

FIGURE 2 is a top plan view similar to FIGURE 1, but showing the arrangement of the implement when the hand saw is reversed in position relative to the position thereof shown in FIGURE 1.

FIGURE 3 is a transverse vertical cross sectional view taken on the line 3—3 of FIGURE 2.

FIGURE 4 is an enlarged fragmentary cross sectional view taken substantially on the line 4—4 of FIGURE 1 with the handle of the implement omitted and illustrating the manner in which one of the pointer elements is utilized as a guide for insuring proper orientation of the saw sharpening file.

FIGURE 5 is an enlarged cross sectional view taken substantially on the line 5—5 of FIGURE 2 with the handle of the implement omitted and illustrating how the other pointer element of the implement is utilized as a guide to insure proper orientation of the file.

FIGURE 6 is a perspective view of a gauge block employed in setting the indicating collar element of the saw filing implement in accordance with the type of saw to be sharpened.

Referring to the drawings, the saw filing implement is designated generally at 11 and comprises a handle 12 having a slotted end 13 and formed with a bore 14 at said slotted end. Designated at 15 is a triangular file whose tang portion 16 is received in the bore 14 and is secured in the slotted end of handle 12 by a clamping collar 17 surrounding the handle at the slotted end thereof. The clamping collar 17 is formed with the parallel end lugs 18, 18 through which extends a clamping screw 19 provided on one end thereof with a wing nut 20, whereby the collar 17 may be tightened on the handle 12 in a predetermined position of angular adjustment thereof relative to the file 15 for a purpose presently to be described.

Mounted on the collar 17 in a common radial plane and projecting radially from said collar are a pair of chuck assemblies 21 and 22 in which are received the respective radially projecting rod-like pointer elements 23 and 24. The chuck assemblies 21 and 22 are separated by a definite angle, for example, an angle of 35 degrees, corresponding to the difference in the inclinations from the vertical of the saw tooth surfaces of a conventional hand saw when the saw is reversed horizontally from end to end. Thus, assuming the saw blade, shown at 25, to be mounted with its serrated top edge horizontal and with its handle located at the left, as viewed in FIGURE 5, the collar 17 is adjusted on the handle 12 so that the radial pointer element 23 will extend perpendicular to the serrated edge of the saw blade 25 when the file 15 is properly engaged against one of the steeper toothed surfaces 30 for sharpening same. With this arrangement, the other radial pointer element 24 will be located to the right of the perpendicular radial pointer element 23. However, if the blade 25 is mounted so that the handle thereof is located at the right end thereof, as viewed in FIGURE 4, the proper position of the file 15 will be indicated when the radial pointer element 24 extends perpendicular to the serrated top edge of the saw blade and the remaining radial pointer element 23 is located to the left of the pointer element 24, as is illustrated in FIGURE 4.

A gauge block 31, shown in FIGURE 6, is employed for proper adjustment of collar 17 in accordance with the type of saw to be sharpened. Thus, the gauge block 31 is formed with a first notch 32 corresponding to the configuration of the grooves between adjacent teeth of a crosscut saw, and is formed with another notch 33 shaped to correspond with the configuration of the groove between adjacent teeth of a rip saw. The collar 17 is adjusted on the handle 12 so that when the file is engaged in either groove 32 or 33, depending upon which type of saw is to be sharpened, one or the other of the pointer elements 23 or 24 will extend vertically, namely, perpendicular to the horizontal surface on which the block 31 is supported, in accordance with the position in which the saw to be sharpened is mounted, namely, whether its handle is located at the left end or at the right end thereof.

In using the implement, the saw blade 25 is fastened in a suitable clamp assembly 35 provided with a horizontal top flange member 36 on which is mounted an indicator bar 37 formed with parallel guide lines 38 extending in the proper axial direction of the implement in order to provide proper orientation thereof in a horizontal plane. As shown in FIGURE 3, the guide bar 37 is mounted so as to underlie the file 15 when the file is engaged in the grooves between the saw teeth, whereby the file may be accurately aligned with the lines 38 and be maintained in parallelism therewith. As shown in FIGURE 2, the bar 37 is provided with parallel reverse guide lines 38' which may be employed when the saw blade is in the reverse position illustrated in FIGURE 2, namely, in the position wherein the saw handle is located at the right end thereof. As above mentioned, the orientation of the file 15 is controlled so that the file is parallel to the guide lines 38 (or 38'), and the handle 12 is held so that one or the other of the radial pointer elements 23 or 24 extends vertically. This assures proper orientation of the triangular file 15 for abrading the tooth surface of the saw to be sharpened.

While a specific embodiment of an improved saw filing implement has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A saw filing implement comprising a handle having a slotted end and provided with a bore at said end, a triangular file engaged in said bore, a clamping collar surrounding the slotted end of said handle, means on said collar to contract same around said slotted end, whereby to secure the collar in an adjusted rotated position on the handle, a pair of angularly spaced chuck assemblies extending radially from said collar in a common radial plane and angularly spaced in accordance with the difference in inclination of saw tooth surfaces to be abraded, and respective rod-like pointer elements mounted in said chuck assemblies, said pointer elements being adapted to indicate the angular position of an abrading face of the file when said face is in contact with a saw tooth surface.

2. A saw filing implement comprising a handle having a slotted end and provided with a bore at said end, a triangular file engaged in said bore, a clamping collar surrounding the slotted end of said handle, means on said collar to contract same around said slotted end, whereby to secure the collar in an adjusted rotated position on the handle, a pair of angularly spaced chuck assemblies extending radially from said collar in a common radial plane, respective rod-like pointer elements mounted in said chuck assemblies, said pointer elements being adapted to indicate the angular position of an abrading face of the file when said face is in contact with a saw tooth surface, said chuck assemblies being separated by an angle corresponding to the difference in the inclination from the vertical of the saw tooth surfaces when the saw to be sharpened is reversed horizontally in position, whereby the file may be adjusted in said handle so that its abrading surface will be in a proper position for filing a tooth surface of the saw when either one or the other of said pointer elements extends perpendicular to the serrated edge of the saw.

References Cited in the file of this patent
UNITED STATES PATENTS

| | | |
|---|---|---|
| 683,842 | Bulson | Oct. 1, 1901 |
| 1,230,561 | Chige | June 19, 1917 |
| 1,404,507 | Adolph | Jan. 24, 1922 |